United States Patent [19]
Van Sistine

[11] Patent Number: 5,497,064
[45] Date of Patent: Mar. 5, 1996

[54] APPARATUS FOR STARTING A SWITCHED RELUCTANCE MOTOR

[75] Inventor: Thomas G. Van Sistine, Menomonee Falls, Wis.

[73] Assignee: A. O. Smith Corporation, Milwaukee, Wis.

[21] Appl. No.: 404,471

[22] Filed: Mar. 14, 1995

[51] Int. Cl.$^6$ ...................................................... H02P 7/00
[52] U.S. Cl. ............................................. 318/701; 318/254
[58] Field of Search ................................. 318/701, 254, 318/138, 439, 686, 696

[56] References Cited

U.S. PATENT DOCUMENTS

| | | | |
|---|---|---|---|
| 3,909,688 | 9/1975 | Blaschke et al. | 318/227 |
| 4,072,888 | 2/1978 | Bechtle et al. | 318/685 |
| 4,253,053 | 2/1981 | Ray et al. | 318/701 |
| 4,520,302 | 5/1985 | Hill et al. | 318/696 |
| 4,670,698 | 6/1987 | Fulton et al. | 318/802 |
| 4,739,240 | 4/1988 | MacMinn et al. | 318/696 |
| 4,746,850 | 5/1988 | Abbondanti | 318/778 |
| 4,772,839 | 9/1988 | MacMinn et al. | 318/696 |
| 4,868,478 | 9/1989 | Hedlund et al. | 318/701 X |
| 4,876,491 | 10/1989 | Squires et al. | 318/138 |
| 4,992,710 | 2/1991 | Cassat | 318/254 |
| 5,001,405 | 3/1991 | Cassat | 318/254 |
| 5,015,939 | 5/1991 | Konecny | 318/701 |
| 5,017,845 | 5/1991 | Carobolante et al. | 318/138 |
| 5,028,852 | 7/1991 | Dunfield | 318/254 |
| 5,043,643 | 8/1991 | Hedlund et al. | 318/254 |
| 5,051,680 | 9/1991 | Belanger | 318/701 |
| 5,097,190 | 3/1992 | Lyons et al. | 318/701 |
| 5,117,165 | 5/1992 | Cassat et al. | 318/254 |
| 5,268,627 | 12/1993 | Baik et al. | 318/701 |
| 5,363,032 | 11/1994 | Hanson et al. | 318/701 X |
| 5,410,235 | 4/1995 | Ehsani | 318/701 |

Primary Examiner—Jonathan Wysocki
Attorney, Agent, or Firm—James Earl Lowe, Jr.; Thomas A. Miller

[57] ABSTRACT

A switched reluctance electronic motor includes a rotor mounted for rotation about an axis and including a plurality of rotor poles. A stator surrounds the rotor and includes at least three stator phases. The motor also includes a circuit for controlling the motor, the circuit includes a pulse generator for supplying a seek current to each of the phases of the motor without causing rotation of the rotor. The seek currents in the phases each have a respective seek current rise time. The rise time is a function of the proximity of the rotor poles to the respective phases. The circuit includes a series of counters for measuring the amount of time required for the seek current in each phase to reach a predetermined seek current threshold and a comparator for comparing the seek current rise times and for establishing a priority sequence determined by which of the phases has the lowest seek current rise time, the intermediate seek current rise time, and the highest seek current rise time The circuit also includes a run signal generator connected to the comparing structure for energizing a selected one of the phases based upon the priority sequence to cause rotation of the rotor.

19 Claims, 3 Drawing Sheets

APPARATUS FOR STARTING A SWITCHED RELUCTANCE MOTOR

BACKGROUND OF THE INVENTION

The invention relates to switched reluctance ("SR") motors and particularly to an apparatus for determining which phase of an SR motor to commutate at a given moment.

SR motors have multiple poles on both the stator and the rotor. There are windings or coils on the stator poles and each pair of windings on diametrically opposite stator poles is connected in series to form an electrically independent phase of the SR motor. There are no windings or magnets on the rotor. However, the rotor is made of a magnetically permeable material such as, for example, a ferrous alloy.

In order to start an SR motor, it is necessary to determine the position of the rotor with respect to the stator. The position of the rotor with respect to the stator establishes which phase of the stator should be energized or commutated first. If the position of the rotor is not correctly determined, commutation of one of the stator phases may result in inefficient starting or reverse operation of the motor. However, many conventional sensors for determining rotor position are bulky, unreliable and expensive.

SUMMARY OF THE INVENTION

The rise time of current in a particular stator phase of an SR motor varies with the inductance of the phase. The inductance of a particular phase of an SR motor is a function of the angular position of the rotor poles with respect to the stator poles comprising the phase. Therefore, the position of the rotor poles can be detected by measuring the rise times of the current in each of the respective stator phases.

The rise time of current in a particular phase varies with the inductance of the phase in accordance with the equation:

$$V = L \, (dI/dT)$$

where V is the voltage across the phase, L is the inductance of the phase, and dI/dT is the change in current with respect to time. In accordance with the present invention, the rise time of current in all three phases is tested and correlated to determine which phase has the highest, intermediate and lowest inductance (these are indicative of the exact position of the rotor poles with respect to the stator). The order of inductances is matched to a ROM based look-up table to determine which phase should be energized or commutated first.

The invention provides an electronic circuit for starting a switched reluctance motor. The motor has a rotor mounted for rotation about an axis and the rotor includes a plurality of rotor poles. The motor also has a stator surrounding the rotor. The stator includes at least three stator pole pairs and at least three stator coils or windings wound around the respective stator pole pairs to form at least three electrically independent stator phases.

The circuit of the invention employs a microprocessor and support circuitry in combination with a field programmable gate array. The use of a gate array in combination with a microprocessor reduces the number of components necessary to practice the invention and reduces the space requirements of the circuit.

In general terms, the electronic circuit includes pulse means for supplying a seek current to each phase of the motor when the rotor is at rest, timing means for measuring the rise time required for the seek current in each of the phases to reach a predetermined seek current threshold, comparing means for comparing the rise times of the seek currents in the respective phases, and run means connected to the comparing means for sequentially energizing or commutating the phases in response to the comparison of seek times.

More specifically, when the motor (i.e., the rotor) is at rest, the pulse means sends a low power seek current pulse to each phase of the SR motor. The current level in each phase is monitored and is measured against time (employing a clock in combination with a series of counters) and a rise time is established for the current in each phase to reach a predetermined seek current threshold, which is equal to roughly 2% to 3% of the maximum running current. The rise times are indicative of the inductances of the respective phases of the SR motor. An order of phase inductances (highest to lowest) is established and compared with combinations of phase inductances stored in a Read-Only-Memory (ROM) based look-up table. In response to a particular phase inductance order, the ROM outputs a control signal to energize a particular phase of the motor.

A principal advantage of the invention is the use of a microprocessor and field programmable gate array to detect rotor position without the use of a discrete rotor position sensor.

Another advantage of the invention is the provision of a simple circuit for starting and driving a switched reluctance motor at low speeds.

Another advantage of the invention is the provision of a circuit that starts a switched reluctance motor and that limits the reverse rotation of the rotor upon starting to a maximum of 2° to 3°.

Other features and advantages of the invention will become apparent to those skilled in the art upon review of the following detailed description, claims and drawings.

Figure 3:
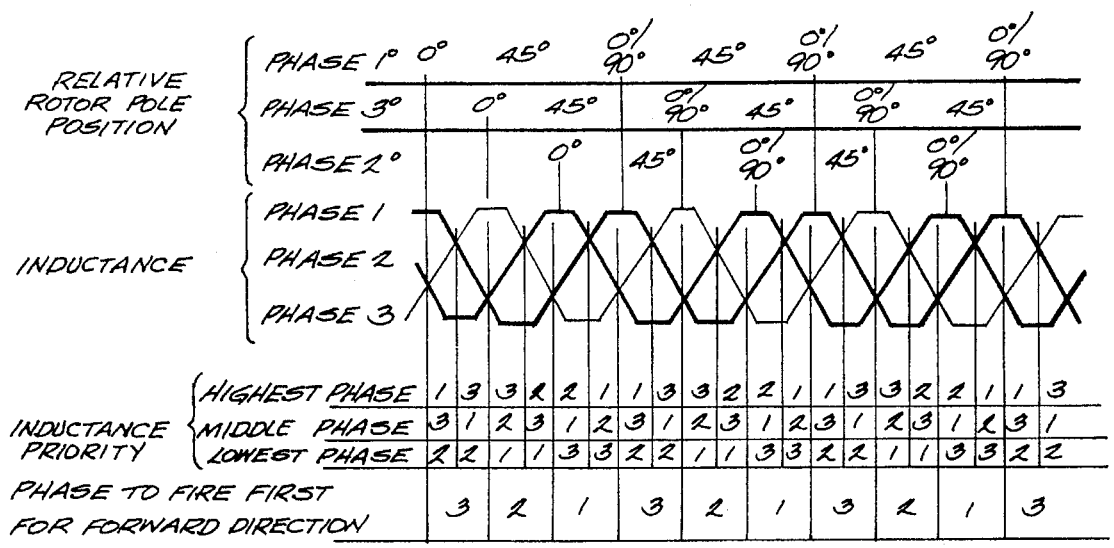
FIG. 3 is a graphic chart illustrating the phase inductances relative to the rotor pole positions, the order, from highest to lowest, of phase inductances relative to rotor pole positions, and the phase which is energized first in response to a particular order of phase inductances.

Before one embodiment of the invention is explained in detail, it is to be understood that the invention is not limited in its application to the details of the construction and the arrangements of the components set forth in the following description or illustrated in the drawings. The invention is capable of other embodiments and of being practiced or being carried out in various ways. Also, it is to be understood that the phraseology and terminology used herein is for the purpose of description and should not be regarding as limiting.

DETAILED DESCRIPTION OF THE PREFERRED EMBODIMENT

Figure 1:
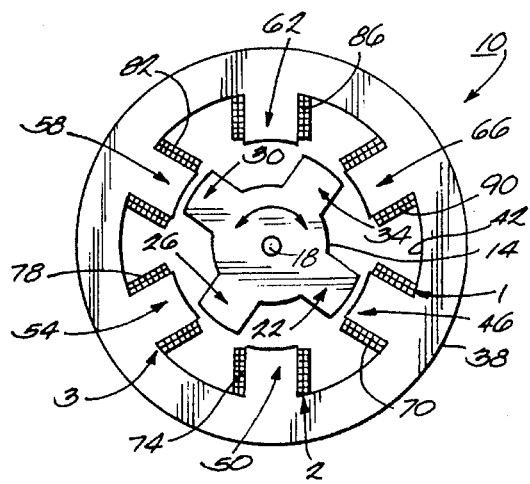
FIG. 1 is a schematic view of a switched reluctance motor showing, in cross-section, the stator and the rotor of the switched reluctance motor.

Shown in FIG. 1 of the drawings is a schematic view of a switched reluctance motor 10. The switched reluctance motor 10 includes a rotor 14 mounted for rotation about an axis 18. The rotor 14 includes four rotor poles 22, 26, 30, and 34. The rotor poles 22, 26, 30, and 34 are evenly spaced about the axis 18 and extend radially outward from the rotor 14 relative to the axis 18.

The motor 10 also includes a stator 38 surrounding the rotor 14. The stator 38 has an inner surface 42 and six stator poles 46, 50, 54, 58, 62 and 66, extending from the inner surface 42 inwardly toward the rotor axis 18. The stator poles 46, 50, 54, 58, 62 and 66, are evenly spaced about the inner surface 42 of the stator 38. Because the motor 10 includes six stator poles and four rotor poles, the switched reluctance motor 10 shown in FIG. 1 is referred to as 6/4 (six stator pole to four rotor pole ratio) switched reluctance motor. While this description will refer to the operation of the invention in terms of a 6/4 SR motor, it should be understood that any switched reluctance motor having any number of stator poles and rotor poles can be controlled with the circuit disclosed herein.

The SR motor 10 also includes windings or coils 70, 74, 78, 82, 86 and 90, on the stator poles 46, 50, 54, 58, 62 and 66, respectively. The windings are made of a conductor of a precise gauge which is wound around the stator pole a precise number of times or turns. The gauge of the wire and the number of turns vary depending upon the application. While the description applies equally to any SR motor using any gauge wire or having any number of turns, in the embodiment shown in the drawings, each stator pole has 98 turns and the motor is referred to as a 98 turn 6/4 SR motor.

The windings 70, 74, 78, 82, 86 and 90, on diametrically opposite stator poles 46, 50, 54, 58, 62 and 66, are connected in series to form three electrically independent phases 1, 2, and 3 of the SR motor 10. As shown in FIG. 1, the windings 70 and 82 on stator poles 46 and 58, respectively, form pole pairs which together form Phase 1, the windings 74 and 86 on stator poles 50 and 62, respectively, form pole pairs which together form Phase 2, and the windings 78 and 90 on stator poles 54 and 66, respectively, form pole pairs which together form Phase 3. Because the rotor 14 is made of ferromagnetic material, energizing a particular phase of the motor 10 results in the formation of a magnetic attraction between the windings on the stator pole pairs comprising the energized phase and the rotor poles closest to the stator poles of the energized phase. By energizing the phases in a particular manner, the rotational direction and speed of the rotor 14 can be precisely controlled.

Figure 2:
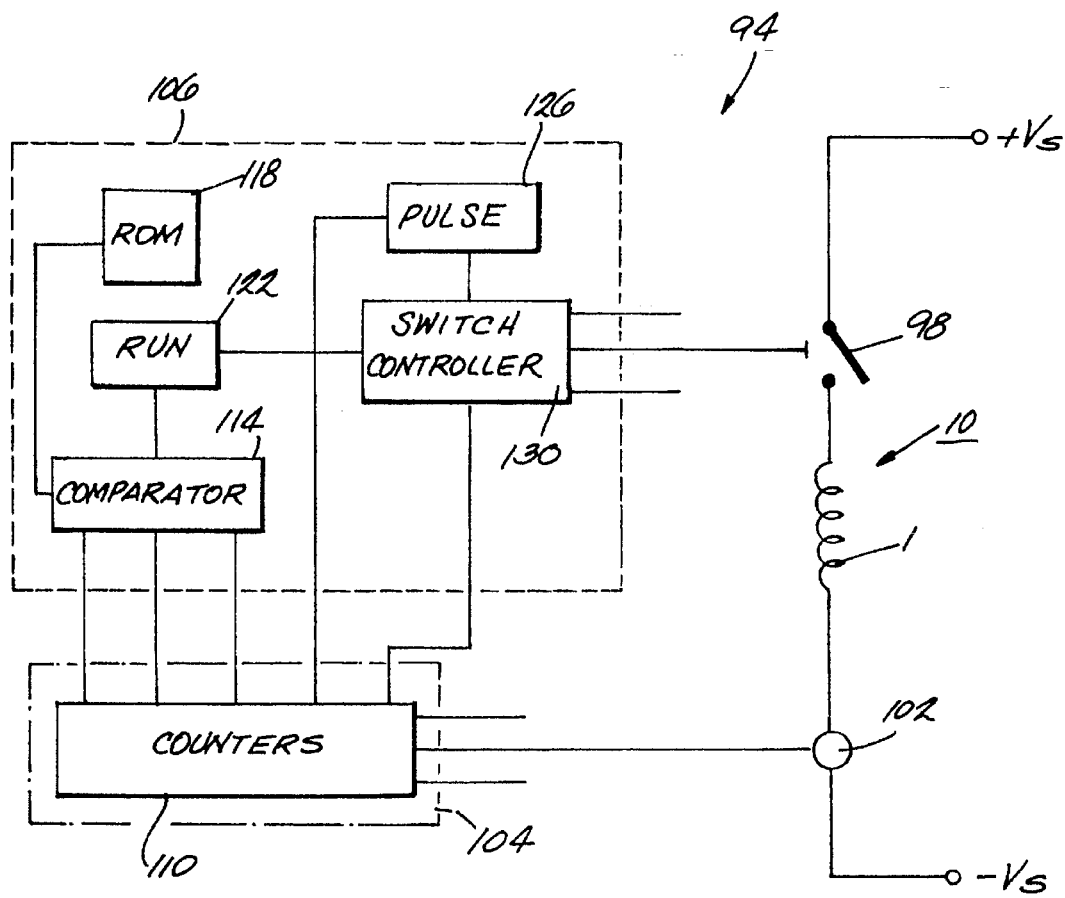
FIG. 2 is a schematic diagram of the electronic circuit for starting the switched reluctance motor, with a simplified illustration of the phase leg of the circuit.

FIG. 2 illustrates a schematic diagram of an electronic circuit 94 for starting the SR motor 10 and energizing the SR motor 10 at low rotor speeds. The circuit 94 is connected to the motor 10 which is shown schematically as phase winding 1 (only one of the three is shown) connected between a positive supply voltage (+Vs) and a negative supply voltage (−Vs) via a switch or relay 98. This portion of the circuit 94 is duplicated as many times as there are phases on the particular SR motor 10. For the SR motor 10 shown in FIG. 1 of the drawings, there are three phases and accordingly, this portion of the circuit 94 is repeated three times, i.e., there are three phase windings connected between the positive and negative supply voltages via three switches or relays 98. Only one of these circuit portions will be shown and described in detail.

The circuit 94 for controlling the motor 10 includes current sensing means connected to the phase winding 1. While any conventional current sensor is appropriate, the sensing means of the embodiment shown in FIG. 2 is a current sensor 102 which is mounted adjacent to the phase current pathway. In the preferred embodiment, a current sensor sold by the LEM Company is used. The current sensor outputs a voltage which is proportional to current. Current flowing through the phase 1 generates a corresponding signal in the sensor 102. The current sensor 102 prevents excess current loading in the phase 1. Preferably, the current sensing means also includes a comparator (not shown) connected to the current sensor 102. The comparator compares the analog signal (voltage) from the current sensor to a reference voltage. When the sensor signal exceeds the reference signal, a latch signal is input to the counter 110, which is explained below.

The circuit 94 also includes a field programmable gate array 104 and a microprocessor 106 connected to the gate array 104. While any appropriate gate array and microprocessor could be used, the circuit 94 uses gate array XC3090-70PC84C manufactured by XILINX, Inc and microprocessor DSP56001RC33 manufactured by Motorola, Inc. The gate array 104 is defined and programmed in a manner consistent with this description and in a manner conventional in the art. Conventional programming hardware recommended by the manufacturer of gate array 104 is also used. Likewise, the microprocessor 106 is programmed in a manner consistent with this description and conventional in the art, with conventional programming hardware recommended by the device manufacturer.

The field programmable gate array 104 includes a bank of counters 110. The counters 110 are connected to the current sensor 102 via the comparator (not shown). The counters 110 receive the digital output from the comparator (not shown) and measure the amount of time required for the current in the phase winding to reach a predetermined current threshold level, i.e., the seek current rise time. The counters 110 are set to zero when the seek current pulse is started. In other embodiments, other timing devices, such as an analog capacitor, could be used instead of the counters 110.

The microprocessor 106 includes comparing means connected to the counters 110. The comparing means compares the seek current rise times from the phase windings and establishes a priority sequence determined by which of the phases 1, 2, or 3, has the lowest seek current rise time, which has the intermediate seek current rise time and which has the highest seek current rise time. The comparing means includes a comparator 114 connected to a read-only-memory (ROM) based memory array 118.

The microprocessor 106 also includes energizing means connected to the comparator 114. The energizing means is a run signal generator 122 which generates commutation or run control signals to energize a selected phase 1, 2, or 3, based upon the order of priority of the seek current rise times.

The microprocessor 106 also includes pulse means connected to the counters 110. The pulse means is a pulse signal generator 126 which generates seek pulse control signals.

The microprocessor 106 also includes switch operating means connected to counters 110, pulse signal generator 126, run signal generator 122 and phase switches 98. The switch operating means is a switch controller 130. The switch controller 130 receives as inputs the pulse control signals and commutation control signals from the pulse signal generator 126 and run signal generator 122, respectively, and activates the phase switch 98 in response thereto to generate either a seek current pulse or a commutation current in the phase winding 1. In other embodiments, these functions could be accomplished by logic devices instead of the microprocessor 106.

Figure 4:
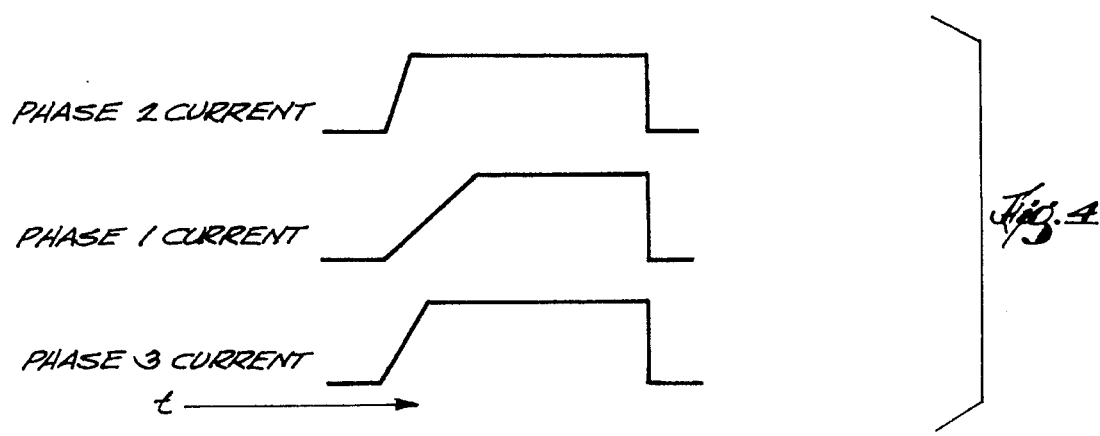
FIG. 4 is a graphic chart illustrating the phase currents versus time showing the simultaneous pulses being applied to each of the three windings.

In operation, when the rotor 14 is at rest and the power switch (not shown) of the motor 10 is turned on, the pulse signal generator 126 of the microprocessor 106 sends control signals to the switch controller 130 which operates the switches 98 of the respective phases, 1, 2 and 3, in such a way as to energize the phases with seek current pulses (see FIG. 4). The seek current pulses are preferably low power and do not generate a sufficiently strong magnetic field in the phases, 1, 2 and 3, to result in rotation of the rotor 14. However, the current in the phase windings, 1, 2, and 3, resulting from the seek current pulses is monitored by the current sensor 102 and is input to the counters 110 of the field programmable gate array. The counters 110 monitor the phase current to calculate the seek current rise times of the seek current in the phases. As discussed above, the rise time of the current in a particular phase will vary with the inductance of the phase and the inductance of the phase is directly related to the proximity of the rotor poles 22, 26, 30, and 34, to the stator poles 46 and 58, 50 and 62, or 54 and 66, comprising the phases 1, 2 or 3, respectively. The seek current rise times of the current in the phases 1, 2 and 3 are transmitted from the counters 110 to the comparator 114. The comparator 114 determines which phase 1, 2 or 3 has the highest, the middle, and the lowest phase inductance. The ROM-based memory array 118 receives as an input the order of phase inductances and generates as an output a signal corresponding to a particular phase that is the first phase to be fired or energized with the high power run current.

FIG. 3 is a chart which illustrates the variation in phase inductances with respect to position of the rotor poles 22, 26, 30, and 34, and the results generated by the ROM-based memory array 118 given a particular order of phase inductances.

Figure 5:
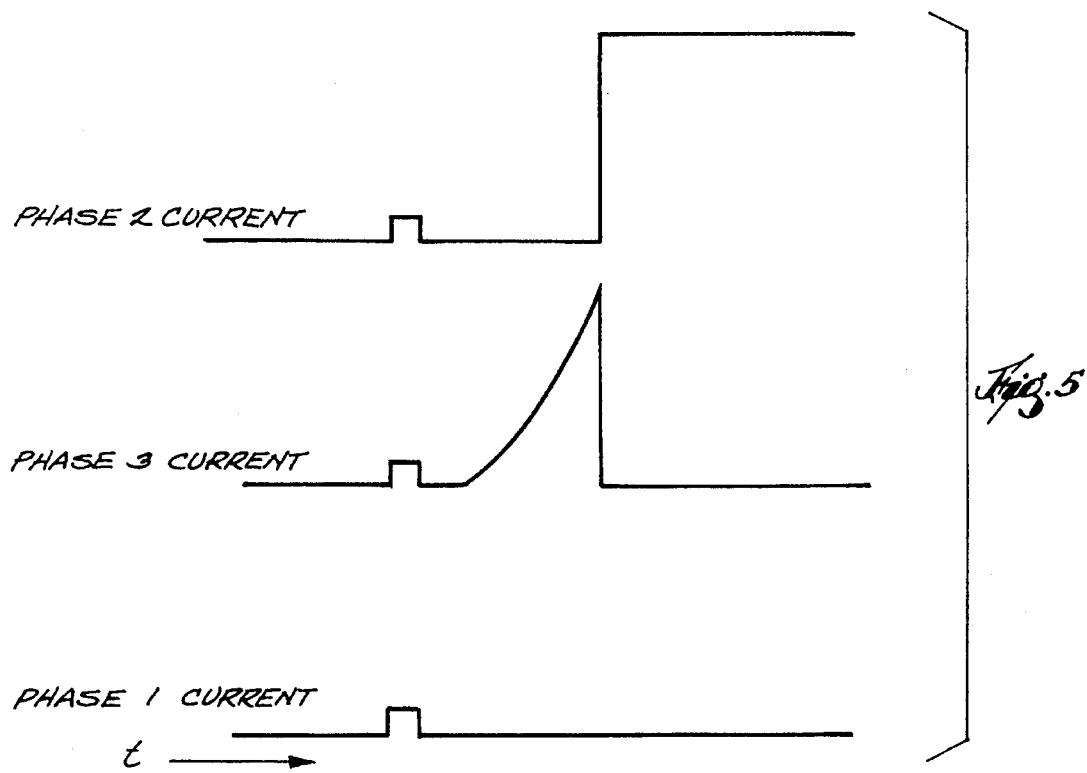
FIG. 5 is a graphic chart illustrating the phase currents versus time with the slow ramp up of the selected phase and then the full run current being applied to the next appropriate phase.

By way of example, if a pair of rotor poles, e.g., 22 and 30, are just past alignment with the stator poles 46 and 58 (FIG. 1) of phase 1 (slightly greater than 0° relative to phase 1), then phase 1 will have the highest inductance, phase 3 will have the middle level inductance and phase 2 will have the lowest inductance. FIG. 4 is an illustration of possible seek pulse currents versus time. In this hypothetical case, phase 3 will be the phase that is energized with the run current first. As illustrated in FIG. 5, as current is applied to phase 3, it slowly goes from zero to the desired run current. In other words, the current is ramped up. This brings the appropriate rotor and stator poles into alignment. Thereafter, the appropriate phase (phase 2) is fired and a low speed switching technique is implemented.

Phase 3 was energized because energizing phase 1 would not result in rotor movement (or perhaps would result in a slight reverse, i.e., counter-clockwise movement) since the rotor poles 22 and 30 are already aligned (or are nearly aligned) with the stator poles comprising phase 1. On the other hand, energizing phase 2 would result in reverse (counter-clockwise) rotation of the rotor 14 with respect to the stator 38 because an attractive magnetic force would exist between stator poles 50 and 62 and the closest rotor poles 26 and 34.

Still referring to FIG. 3, it is possible that the order of inductance can be incorrectly determined. This may occur when the rotor poles are aligned so that two of the phase inductances are equal or nearly equal. This typically occurs at approximately the 15° division marks as shown in FIG. 3.

However, and as shown in FIG. 3, an error with respect to which phase has the highest level inductance and which phase has the middle level inductance will still result in the same phase being energized or commutated first. If there is an error with respect to which phase has the lowest level inductance versus which phase has the middle level inductance, energizing the wrong phase first will result in a minimal reversal of 2° to 3° back to alignment of the previous phase.

Other features and advantages of the invention are set forth in the following claims.

I claim:

1. A switched reluctance electronic motor comprising:

a rotor mounted for rotation about an axis and including a plurality of rotor poles;

a stator surrounding said rotor and including at least three stator phases; and a circuit for controlling said motor, the circuit including pulse means for supplying a seek current to each of said phases of said motor without causing rotation of said rotor, said seek currents in said phases each having a respective seek current rise time which is a function of the proximity of said rotor poles to said respective phases;

timing means for measuring the amount of time required for said seek current in each phase to reach a predetermined seek current threshold;

comparing means for comparing said seek current rise times and for establishing a priority sequence determined by which of said phases has the lowest seek current rise time, the intermediate seek current rise time, and the highest seek current rise time; and energizing means connected to said comparing means for energizing a selected one of said phases based upon said priority sequence to cause rotation of said rotor.

2. A switched reluctance motor as set forth in claim 1 wherein said circuit comprises a microprocessor and a field programmable gate array connected to said microprocessor.

3. A switched reluctance motor as set forth in claim 1 wherein said pulse means is a pulse signal generator.

4. A switched reluctance motor as set forth in claim 3 wherein said circuit further includes a power supply, at least three switches for respectively connecting the phases to said power supply, and a switch controller connected to said pulse signal generator and to said switches so that said switches are operated to generate said seek currents in said respective phases.

5. A switched reluctance motor as set forth in claim 1 wherein said timing means includes current sensing means for detecting the amount of current in each of the phases and at least one counter connected to said current sensing means.

6. A switched reluctance motor as set forth in claim 1 wherein said comparing means includes a comparator and at least one solid state memory array connected to said comparator.

7. A switched reluctance motor as set forth in claim 6 wherein said solid state memory array is a read-only-memory array.

8. A switched reluctance motor as set forth in claim 1 wherein said energizing means includes a run signal generator connected to said comparing means.

9. A switched reluctance motor as set forth in claim 1 wherein said circuit further includes an electrical energy source and a plurality of switches connected between a respective phase of said motor and said electrical energy source.

10. A switched reluctance motor as set forth in claim 9 wherein said circuit further includes a switch controller connected to said pulse means and to said energizing means such that said switch controller generates phase switch control signals to operate said switches in response to signals generated by said pulse means and said energizing means.

11. A switched reluctance motor providing rotor position detection without a rotor shaft position sensor, said motor comprising:

a rotor mounted for rotation about an axis and including a plurality of rotor poles;

a stator surrounding said rotor and including at least three stator phases;

energizing means for selectively energizing said phases in succession to rotate said rotor, said energizing means including, an electrical energy source, a plurality of phase switches connected between said phases and said energy source for selectively electrically connecting said energy source to said phases, switch operating means connected to said phase switches for selectively operating said phase switches; and starting means for determining which of said phases to energize first for rotating said rotor, said starting means including pulse means connected to said switch operating means for operating all of said switches for a limited time to connect said energy source to said phases without causing rotation of said rotor so as to simultaneously generate a seek current in each of said phases, current sensing means for sensing the amount of seek current in each of said phases, timing means connected to said current sensing means and to said switch operating means for measuring the amount of time for said seek current in each of said phases to reach a predetermined current level threshold and for establishing a seek current rise time for each of said phases, and comparing means connected to said timing means for determining the lowest, intermediate and highest seek current rise times; and said energizing means energizing a selected phase of said motor based upon said priority sequence so as to cause rotation of said rotor.

12. A switched reluctance motor as set forth in claim 11 wherein said energizing means includes a microprocessor and a field programmable gate array connected to the microprocessor.

13. A switched reluctance motor as set forth in claim 11 wherein said pulse means is a pulse signal generator.

14. A switched reluctance motor as set forth in claim 13 wherein said circuit further includes a switch controller and wherein said pulse signal generator is connected to said switch controller so that said switches are operated in response to pulses generated by said pulse signal generator to generate said seek currents in said respective phases.

15. A switched reluctance motor as set forth in claim 11 wherein said timing means includes at least one counter connected to said current sensing means.

16. A switched reluctance motor as set forth in claim 11 wherein said comparing means includes a comparator and at least one solid state memory array connected to said comparator.

17. A switched reluctance motor as set forth in claim 16 wherein said solid state memory array is a read-only-memory array.

18. A switched reluctance motor as set forth in claim 11 wherein said energizing means includes a run signal generator connected to said comparing means.

19. A switched reluctance motor as set forth in claim 18 wherein said switch operating means includes a switch controller connected to said pulse means and to said run signal generator such that said switch controller generates phase switch control signals to operate said phase switches in response to signals generated by said pulse means and said run signal generator.

\* \* \* \* \*